Oct. 7, 1930.  N. A. CHRISTENSEN  1,777,462
WHEEL BRAKE MECHANISM
Filed April 19, 1924   2 Sheets-Sheet 1

INVENTOR.
NIELS A. CHRISTENSEN
BY Quarles & French
ATTORNEYS.

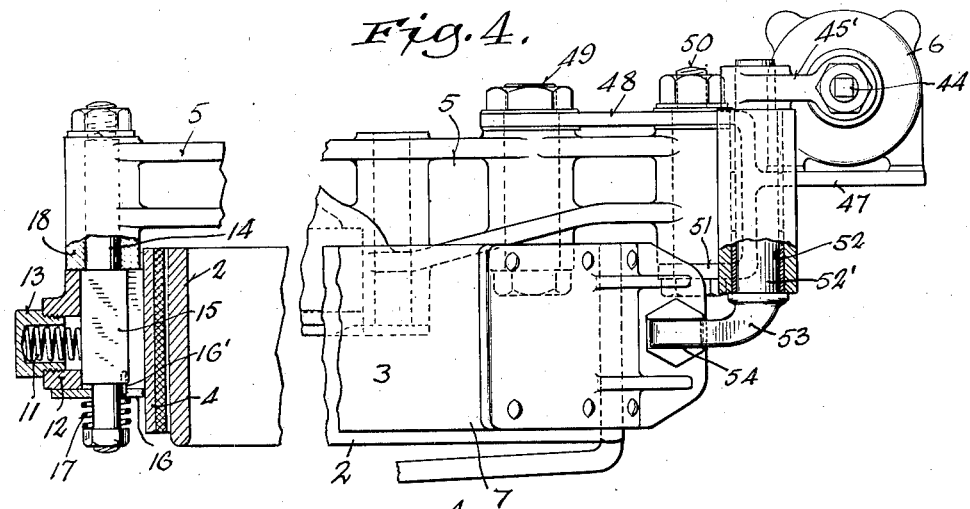
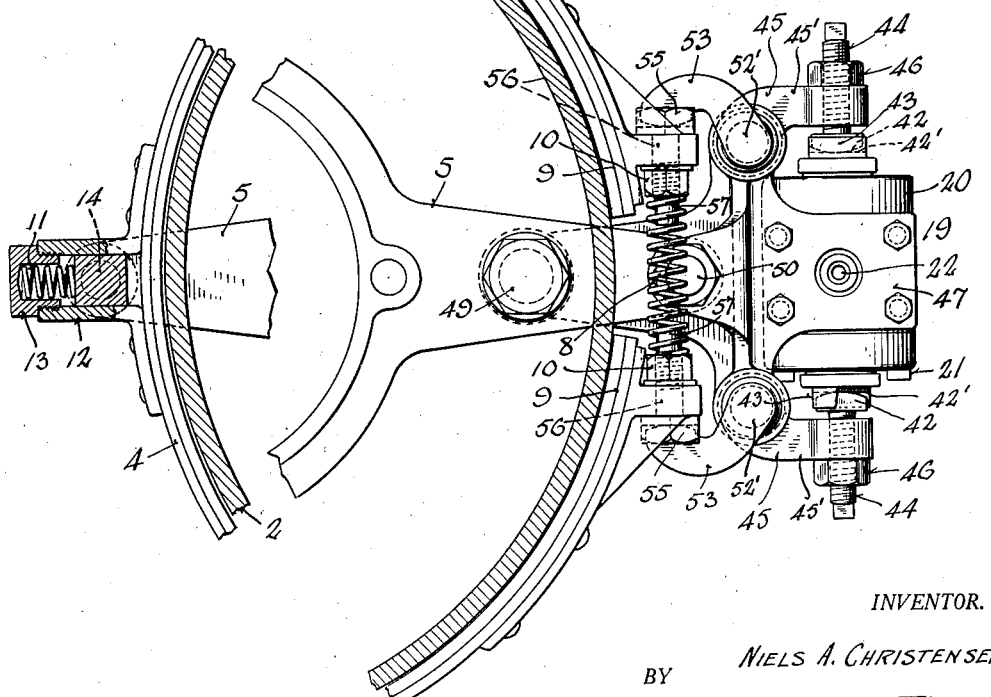

Patented Oct. 7, 1930

1,777,462

UNITED STATES PATENT OFFICE

NIELS A. CHRISTENSEN, OF MILWAUKEE, WISCONSIN

WHEEL BRAKE MECHANISM

Application filed April 19, 1924. Serial No. 707,706.

The invention relates to vehicle brakes, and more particularly to those brakes for use with automotive vehicles and trailers for such vehicles.

The object of the invention is to provide a brake mechanism in which a powerful braking force is applied to bring a band-brake into braking engagement with the brake-drum through the use of a fluid-pressure-operated motor and leverage connections between said motor and the ends of the band-brake.

A further object of the invention is to provide a novel form of clearance adjustment for the brake-band in combination with the operating connections therefor.

The invention further consists in the several features hereinafter set forth and more particularly defined by claims at the conclusion hereof.

In the drawings: Fig. 1 is a sectional view through the brake-drum, looking toward its open end, parts of said drum and brake being broken away, showing the brake mechanism embodying the invention, with parts thereof shown in section;

Fig. 3 is a sectional view through brake mechanism embodying a modified form of the invention, parts of said drum and brake being broken away and parts of the band being shown in section;

Fig. 4 is a plan view, with parts broken away and shown in section, of the structure shown in Fig. 3.

Figure 2:
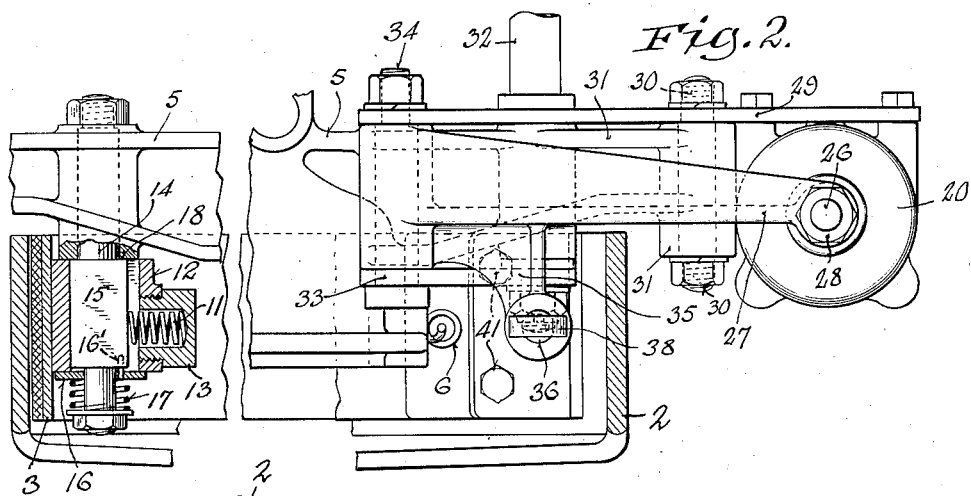
Fig. 2 is a plan view with parts broken away and parts shown in section, and showing a sectional detail taken on the line 2—2 of Fig. 1.
Figure 1:
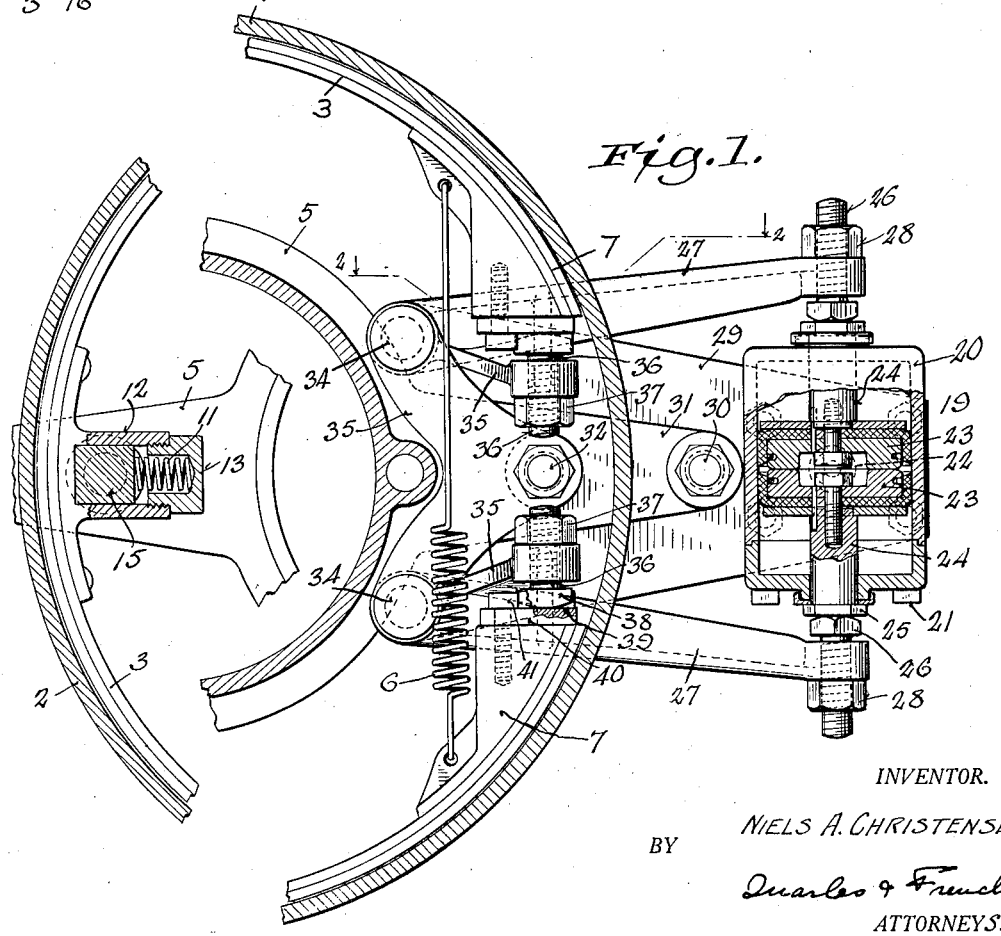

In the drawings the numeral 2 designates a revoluble brake-drum which, it will be understood, is adapted to be secured to the wheel of the vehicle and revolve therewith, and in Figs. 1 and 2, 3 designates a band-brake of the internal expanding type engageable with said drum, and in Figs. 3 and 4 the numeral 4 designates a band-brake generally similar to 3 and of the external contracting type engageable with said drum, the band-brake in each instance being supported intermediate its ends upon the axle housing 5 or other part of the vehicle independent of the drum and wheel and being provided with the usual brake-lining.

If the band-brake be used internally, as shown in Figs. 1 and 2, the brake is released in part by a spring 6 anchored at its ends to lugs 7 at the ends of the band 3. If the band-brake be used externally, as shown in Figs. 3 and 4, the brake is released in part by a spring 8 interposed between the lugs 9 at the ends of the band 4, and in the present instance bearing against nuts 10 associated with said lugs. In each instance a spring 11 acts in a radial direction and against the central part of the band to move said band bodily away from its brake drum, and for this purpose a yoke 12 is secured to the central part of the band and the spring 11 in each instance acts between a screw-threaded plug 13 in said yoke, an anchor member 14 here shown securely bolted to the axle housing. Each yoke 12 provides a flat-sided slot in which the squared or flat-sided portion 15 of the anchor member 14 is slidably mounted so that the yoke cannot turn but is restricted to a straight line movement in a radial direction. Thus, it will be noted with either form of band-brake spring means normally hold the same free of the drum or in a release position.

To prevent lateral displacement of the band I show, in each instance, a plate 16 yieldingly held against the yoke 12 by a spring 17 mounted on the outer end of the member 14, and prevented from rotating by a pin 16' engaging in an opening in the anchor member and acting to hold said yoke against a boss 18 of the axle housing.

The band-brake is, in each instance, set or applied by a fluid-pressure-operated motor 19 and levers connecting the pistons of said motor with the lugs at or adjacent the ends of the brake. In each instance this motor comprises a two-part brake-cylinder 20 whose parts are secured together by bolts 21 and which is provided with a central air-port 22 for the inlet and exhaust of compressed air. A pair of opposed suitably packed pistons 23 work in said cylinder and have piston rods 24 bolted and pinned or otherwise suitably secured to the heads of said pistons and projecting from the ends of the cylinder.

In Figs. 1 and 2 the head 25 of each piston rod is engaged by the head of a jack-screw 26 in abutting contact therewith and adjustably carried in the threaded end of the longer arm of a two-armed lever 27 and held in adjusted position by a lock-nut 28. The brake-cylinder is here shown as mounted on and bolted to a plate 29 secured by a bolt 30 to a bracket 31 which is connected to a rod 32 associated with the axle housing, and said plate also is apertured and non-rotatably mounted on said rod 32. The bracket 31 is also mounted between said plate 29 and another plate 33 which is rigidly clamped to the rod 32 at one point and connected by bolts 34 to the plate 29. These bolts 34 form pivots for the levers 27 and in each instance the shorter arm 35 of each lever has its end projecting laterally beyond the plate 33 and forming a lug or boss having a threaded opening in which a jack-screw 36 is adjustably mounted and secured in adjusted position by a lock-nut 37, said screw having a flat-sided head 38 fitting in a flat-sided slot 39 in a plate 40 secured by bolts 41 to the ends of the lugs 7.

With the construction shown in Figs. 1 and 2 it will be noted that when compressed air is introduced between the two pistons 23, causing them to move outwardly, that the levers 27 swing about their pivots and through their abutting connection with the lugs 7 swing the free ends of the band outwardly and thus move said band into braking engagement with the drum, and that the release position of the band may be maintained by the proper adjustment of the jack-screws 26 since the pistons act as stops for limiting the release position of said levers 27, and since a wrench may be applied to the polygonal heads of said screws to turn them to the desired position to adjust the brake as it wears down in service.

In Figs. 3 and 4 the head 42 of each piston rod has a flat-sided slot 42' receiving the flat-sided head 43 of a jack-screw 44 in abutting contact therewith and adjustably carried in the end of the longer arm 45' of a lever 45 and held in adjusted position by a lock-nut 46. The brake-cylinder is here shown as mounted on and bolted to a bracket 47 having a portion 48 secured by bolts 49 and 50 to the axle housing and a portion 51 secured by the bolt 50 to said housing. This bracket provides spaced pivot bearings 52 for the levers 45 which are conveniently made in two parts, the longer arm 45' being secured to the other part which forms a pivot pin portion 52' and a shorter arm 53. The end of the arm 53 has flat sides fitting within a flat-sided slot 54 in the hexagonal head 55 of a bolt 56 which passes through an aperture in the lug 9 and is clamped in position by the nut 10, the end 57 of the bolt extending down below said nut and centering the end of the spring 8 which fits over it. The mounting of the spring 8 in the manner above described also permits the spring 11 to move the band clear of the drum when the braking pressure is released.

It will be noted that in Figs. 1 and 2 the tongue-and-groove connection includes slots 39 which extend at right angles to the axis of rotation of the drum, and that the slot 54 and the end of the arm 53 are similarly positioned. By this arrangement the ends of the brake bands are guided in their movement and the bands are thus prevented from moving laterally relative to their drums.

With this last described construction it will be noted that when the pistons within the brake-cylinder are moved outwardly by compressed air introduced into said cylinder that the piston rods swing the arms 45' of the lever 45 outwardly and thereby move the arms 53 toward each other and consequently move the ends of the brake-band with which they contact toward each other and thus draw said band into braking contact with said drum. The release position of the band may be maintained by the proper adjustment of the screws 44 which may be turned by providing them with squared ends 58 on the loosening up of nuts 46, or the heads 42 of the piston rods may be of polygonal shape so that they may be engaged by a wrench and turned to thereby turn said screws 44. Thus, the release position of the band may be readily adjusted to accommodate its wear in service.

It will be noted that since the motor acts on the longer end of the lever and hence at a greater distance from its pivot point than the distance from said point to the contact of the shorter arm with the lug of the brake-band that an increase in braking pressure is had due to the increase in leverage obtained thereby. Furthermore, these leverage connections permit the motor being placed outside the drum and in a position where the adjustment for the clearance of the band may be readily affected. It is also to be noted that the levers have direct thrust connections with the motor and band. In each instance the release of air from the brake-cylinder permits the springs to move the band to a release position and return the pistons in said cylinders to their initial position.

While compressed air is the preferred pressure transmitting medium, because of its ease of control, its adaptability for efficient service throughout all seasons of the year in different climates, and its practical efficiency even where small leakage may occur in the motor, it is to be understood that I do not wish to be limited thereto, as any other suitable gas, oil, or other suitable liquid may be used to operate the motor.

Furthermore, while the device is shown in connection with an axle housing for a rear wheel, it will be understood that it may be used on a steering wheel by mounting the motor, the levers and the support for the band-brake on arms carried by the steering knuckle.

I, therefore, desire it to be understood that this invention is not to be limited to any specific form or arrangement of parts except in so far as such limitations are specified in the claims.

What I claim as my invention is:

1. In brake mechanism of the class described, the combination with a revoluble brake-drum, of a brake having parts engageable with said drum, means for releasing said brake, a fluid-pressure-operated motor supported outside of said drum and provided with a pair of oppositely moving pistons and piston rods, a pair of levers, each lever pivotally supported intermediate its ends and having an adjustable tongue-and-groove thrust connection at one end with the rod of the piston associated therewith and a tongue-and-groove connection at its other end with an end portion of said brake and imparting a braking force, greater than the braking pressure, to said brake to move the same into braking engagement with said drum.

2. In brake mechanism of the class described, the combination with a revoluble brake-drum, of a brake engageable with said drum, a fluid-pressure-operated motor including a thrust rod, a pivoted lever having a thrust connection at one point with said rod, a tongue-and-groove connection between another point of said lever and an end portion of said brake, and means to release said brake.

In testimony whereof, I affix my signature.

NIELS A. CHRISTENSEN.